(12) United States Patent
Miyazaki et al.

(10) Patent No.: US 10,642,124 B2
(45) Date of Patent: May 5, 2020

(54) OPTICAL MODULATOR AND OPTICAL TRANSMISSION DEVICE USING THE SAME

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 0 days.

(21) Appl. No.: 16/205,243

(22) Filed: Nov. 30, 2018

(65) Prior Publication Data

US 2019/0163028 A1    May 30, 2019

(30) Foreign Application Priority Data

Nov. 30, 2017 (JP) ................. 2017-230088

(51) Int. Cl.
| | |
|---|---|
| *G02F 1/225* | (2006.01) |
| *G02F 1/035* | (2006.01) |
| *H04B 10/25* | (2013.01) |
| *H04B 10/516* | (2013.01) |
| *G02F 1/21* | (2006.01) |
| *H04B 10/532* | (2013.01) |
| *H04B 10/556* | (2013.01) |

(52) U.S. Cl.
CPC .............. *G02F 1/225* (2013.01); *G02F 1/035* (2013.01); *H04B 10/2504* (2013.01); *H04B 10/5161* (2013.01); *G02F 2001/212* (2013.01); *G02F 2203/21* (2013.01); *H04B 10/532* (2013.01); *H04B 10/5561* (2013.01)

(58) Field of Classification Search
None
See application file for complete search history.

(56) References Cited

U.S. PATENT DOCUMENTS

| | | | |
|---|---|---|---|
| 2015/0063809 A1* | 3/2015 | Sugiyama | ............... H04J 14/06 398/65 |
| 2015/0078763 A1* | 3/2015 | Sugiyama | ............... G02F 1/225 398/200 |

FOREIGN PATENT DOCUMENTS

| | | |
|---|---|---|
| JP | 2014199302 | 10/2014 |
| JP | 2015069162 | 4/2015 |
| JP | 2017134241 | 8/2017 |
| WO | WO-2015115382 A1 * | 8/2015 |

* cited by examiner

*Primary Examiner* — Chad H Smith
(74) *Attorney, Agent, or Firm* — JCIPRNET

(57) ABSTRACT

A small and inexpensive optical modulator having suppressed temperature drift and high reliability and an optical transmission device using the same are provided. The optical modulator includes an optical waveguide substrate where an optical waveguide is formed; a control electrode that is provided on the optical waveguide substrate and applies an electric field to the optical waveguide; and a relay substrate that is disposed in the vicinity of the optical waveguide substrate and includes electrical wirings that relay electrical signals from the outside to the control electrode. The control electrode includes a signal electrode. The optical modulator comprises terminating units that include terminal resistors that terminate the signal electrode. At least a part of the terminating units are provided on the relay substrate.

9 Claims, 8 Drawing Sheets

OPTICAL MODULATOR AND OPTICAL TRANSMISSION DEVICE USING THE SAME

CROSS-REFERENCE TO RELATED APPLICATION

The present application is related to and claims priority from Japanese patent application no. 2017-230088, filed on Nov. 30, 2017. The entire contents of the aforementioned application are hereby incorporated by reference herein.

BACKGROUND

Technical Field

The disclosure relates to an optical modulator and an optical transmission device using the same, and particularly, to an optical modulator including a terminating unit in which terminal resistors are disposed at a termination of a signal electrode and an optical transmission device using the same.

Description of Related Art

In recent years, in high speed/large capacity optical fiber communication systems, optical modulators using a substrate in which an optical waveguide is formed and optical transmission devices into which such optical modulator is incorporated have been widely used. With regard to these, an optical modulator in which LiNbO$_3$ (referred to as "LN") having an electrooptic effect is used for a substrate has advantages over a modulator made of a semiconductor material such as InP, Si, and GaAs and is widely used for high speed/large capacity optical fiber communication systems. An optical modulator using this LN includes an optical waveguide that confines light in an LN substrate and guides it, and additionally, a control electrode that applies an electric field to the optical waveguide is formed. In addition, the control electrode includes an RF electrode (signal electrode) that applies a high frequency signal and a DC bias electrode that applies a low frequency signal and a DC bias voltage.

Due to the trend of increasing transmission capacity in recent years, a modulation method of an optical modulator for a high speed/large capacity optical fiber communication system has been changed from conventional intensity modulation (on-off keying) and the like to multi-level modulation such as quadrature phase shift keying (QPSK) and dual polarization-quadrature phase shift keying (DP-QPSK) using phase modulation and a transmission format in which polarization multiplexing is used in multi-level modulation, which have become mainstream. In addition, a method in which a plurality of DP-QPSK chips for multiple elements are used and a transmission capacity is further increased has been proposed (for example, refer to Patent Document 1: Japanese Patent Laid Open No. 2015-69162).

As shown in FIG. 1, in a DP-QPSK optical modulator, an optical waveguide 2 in which two nested optical waveguides constituted by two Mach-Zehnder type optical waveguides are disposed is formed on a substrate (optical waveguide substrate) 1 of LN or the like. In addition, in order to apply modulation signals to modulation units constituted by Mach-Zehnder type optical waveguides, a plurality of signal electrodes (not shown) are provided on the substrate 1. The modulation signals are inputted to the signal electrodes through an input connector 4. In addition, terminal resistors 70 are connected to terminals of the signal electrodes. When the terminal resistors 70 are disposed corresponding to the signal electrodes as shown in FIG. 1, a plurality of terminal resistors 70 are provided on the same terminal substrate 7, and the size of the optical modulator may be reduced. The substrate (optical waveguide substrate) 1 of LN or the like and the terminal substrate 7 are disposed in a housing 9 and packaged.

In order for the optical modulator to operate at a high speed, a configuration of a traveling wave type electrode that input electrical signals propagate through the signal electrodes is used. A signal frequency inputted to the signal electrodes is a high frequency signal in a microwave band, and almost all of the input electric energy is consumed in the terminal resistors 70 and converted into heat there.

DP-QPSK includes four modulation units. In order to support a phase modulation method in this configuration, driving is performed at a voltage amplitude twice (4 times in the case of power) that of an intensity modulation method using a single modulator structure in the related art. Therefore, the power consumed in the modulator is 16 times or more that of a modulator using a single modulator structure in the related art. However, in order to cope with the demand for reducing the size of an optical modulator, it is necessary for the terminal substrate 7 to be disposed in the vicinity of the optical waveguide substrate 1, and heat generated in the terminal substrate is a significant problem.

However, in the case of a multi-element configuration in which two or more DP-QPSK modulator configurations are incorporated into the same housing and a transmission capacity increases, an amount of heat is 32 times or more an amount of heat generated in an intensity modulation method using a single modulator structure in the related art. Heat generated in the terminal substrate causes deterioration in temperature drift in the optical modulator. In addition, heat generated in the terminal resistors themselves is a cause of deterioration, cracking and separation of the terminal resistors over time, and causes serious problems such as deterioration of the reliability of the optical modulator and an optical transmission device using the same.

The influence of heat generated in the terminal substrate is inherent in most optical modulators having a traveling wave type electrode configuration. However, in the related art, these problems have not been studied yet and countermeasures have not been taken. Rather, the influence of heat generated becomes lost in change in temperature of an environment in which an optical modulator is placed and instability of the optical modulator and is treated as a problem of deterioration of characteristics such as temperature drift in an optical modulator in the related art.

However, regarding this influence, the influence is particularly large in an optical modulator having a DP-QPSK configuration, in which (a) amplitudes of input electrical signals are large, (b) a plurality of terminal resistors is included, and (c) the terminal resistors are provided on the same substrate, and the problem has become more serious. Furthermore, the influence becomes more serious due to that the optical modulator has (d) a small size, and (e) a plurality of elements (multi-element configuration).

As a countermeasure for reducing problems of heat generated in such terminal resistors, as shown in Patent Document 2 (Japanese Patent Laid Open No. 2014-199302), increasing an area of the terminal resistors and providing heat conduction holes in a terminal substrate have been proposed. However, in such a configuration and method, the size of the terminal substrate itself increases and production costs also increase, and the suitable applications are thus limited. Therefore, a solution that can be applied in various transmission formats and satisfies requirements for a small size and low costs is desired. In addition, there is a demand for an optical transmission device that has high reliability and reduced temperature drift by mounting an optical modulator to which countermeasures for heat generated are applied.

In addition, Patent Document 3 (Japanese Patent Laid Open No. 2017-134241) proposes a method of suppressing an amount of heat transferred from a terminal substrate to an optical waveguide substrate in order to suppress an influence of heat generated in the terminal substrate on the optical waveguide substrate. However, there has been an increasing need for further reducing the size of the optical modulator and suppressing an influence of heat generated in the terminal substrate and further improvement is expected.

As described above, the disclosure is to provide an optical modulator that suppresses an influence of heat generated in terminal resistors and an optical transmission device using the same. In particular, like a DP-QPSK optical modulator, in an optical modulator including a plurality of signal inputs and a plurality of terminal resistors, suppressing the heat generated in the terminal resistors is more significantly. In addition, by providing an effective countermeasure for heat generation, the disclosure provides an optical modulator that has a small size and multiple elements and is inexpensive and an optical transmission device using the same.

SUMMARY

In view of above description, an optical modulator of the disclosure and an optical transmission device using the same are provided. The optical modulator includes an optical waveguide substrate wherean optical waveguide is formed; a control electrode that is provided on the optical waveguide substrate and applies an electric field to the optical waveguide; and a relay substrate that is disposed in the vicinity of the optical waveguide substrate and includes electrical wirings for relaying electrical signals from the outside to the control electrode. The control electrode includes a signal electrode. The optical modulator comprises terminating units that include terminal resistors that terminate the signal electrode. At least a part of the terminating units are provided on the relay substrate.

DESCRIPTION OF THE EMBODIMENTS

Optical modulators according to the disclosure will be described below in detail with reference to FIGS. 2 to 11. FIGS. 2 to 6 are plan views of an optical modulator. In the disclosure, an optical modulator includes an optical waveguide substrate 1 where an optical waveguide is formed, a control electrode (not shown) that is provided in the optical waveguide substrate and applies an electric field to the optical waveguide, and a relay substrate 3 that is disposed in the vicinity of the optical waveguide substrate and includes electrical wirings that relay electrical signals from the outside to the control electrode. The control electrode includes a signal electrode, and the optical modulator includes terminating units T including terminal resistors 70 that terminate the signal electrode, and at least some of the terminating units are provided on the relay substrate 3.

A dielectric such as $LiNbO_3$, $LiTaO_3$, or the like or a semiconductor such as InP, Si or the like may be used as the optical waveguide substrate 1. In the optical modulator of the disclosure, the material of the optical waveguide substrate is not particularly limited to, but dielectric or semiconductor substrate known in the related art can be also used. In addition, when forming an optical waveguide, it is possible to use known techniques such as a method of thermally diffusing Ti into a dielectric substrate of $LiNbO_3$ and forming an optical waveguide or forming a ridge type optical waveguide.

Figure 2:
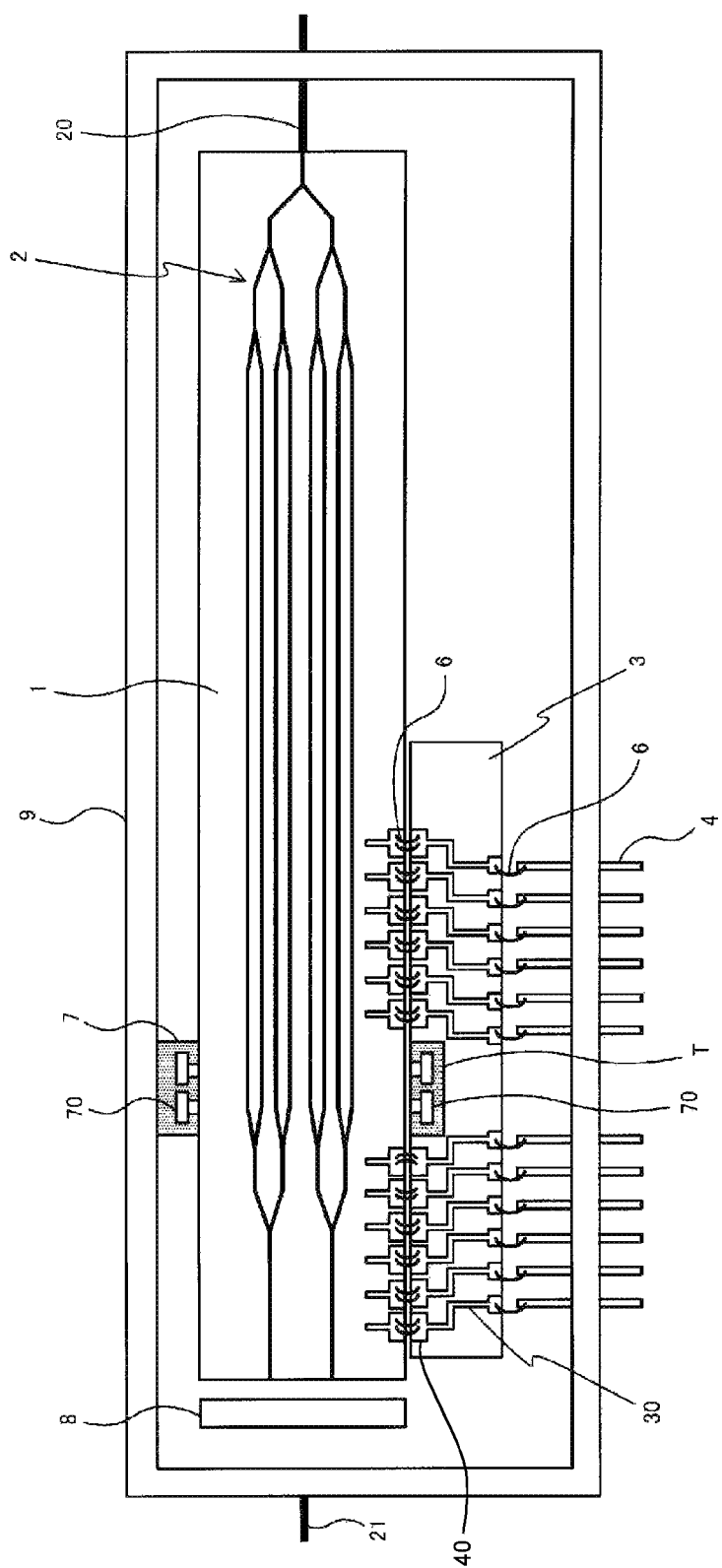
FIG. 2 is a plan view showing the first embodiment of an optical modulator according to the disclosure.

In the optical waveguide substrate, the control electrode is formed along the optical waveguide 2. For the control electrode, a signal electrode for performing a modulation operation on a high frequency signal and a DC bias electrode for bias control are formed. In FIG. 2 and the like, only input terminals (pad part) 40 of the control electrode are drawn. For the control electrode, a pattern of a base electrode is formed on the optical waveguide substrate 1, and then an electrode with a thickness of several tens of μm is formed using Au by a plating method.

The configuration of the optical waveguide is a so-called nested optical waveguide in which one Mach-Zehnder type optical waveguide and two Mach-Zehnder type optical waveguides are disposed in a nested form. In addition, like a DP-QPSK optical modulator shown in FIGS. 2 to 6, various optical waveguide forms such as a form in which two nested optical waveguides are disposed can be used. FIGS. 2 to 6 show an example of the optical modulator, and when a light wave inputted through the input optical fiber 20 propagates through the optical waveguide 2, it is subjected to light modulation by the control electrode (not shown). A light wave emitted from the optical waveguide substrate 1 is combined with a polarization beam by a polarization beam combining unit 8 and is incident to an output optical fiber 21.

In addition, as shown in FIG. 2 and the like, regarding the number of signal electrodes that apply input electrical signals to a modulation part of the optical waveguide, the disclosure is not limited to the DP-QPSK optical modulator including four signal electrodes. The disclosure can be applied to various types such as a single type (one signal electrode for modulation), a dual type (two signal electrodes for modulation), and a DQPSK configuration modulator (two signal electrodes for modulation). In particular, as the number of signal electrodes increases, the disclosure can be more effectively applied. For example, the disclosure can be particularly effectively applied to a multi-element configuration in which two DP-QPSK optical modulators are incorporated and 8 input electrical signals are included.

The relay substrate 3 is disposed in the vicinity of the optical waveguide substrate 1. In addition, it is also possible to dispose a terminal substrate 7 as necessary. Since a material used for the relay substrate 3 and the terminal substrate 7 is used at a high frequency such as a microwave band, ceramic materials such as alumina superior to high frequency characteristics and the like are frequently used. In the control electrode of the optical waveguide substrate 1, a part or all of electrical wirings 30 for relaying electrical signals inputted from input/output pins 4 and a DC bias voltage are formed on the relay substrate 3. In addition, a gap between the input/output pins 4 and the electrical wirings 30 on the relay substrate 3 and a gap between the electrical wirings 30 of the relay substrate 3 and the input terminals of the control electrode of the optical waveguide substrate 1 are wire-bonded by an Au conductive wire or the like.

Figure 1:
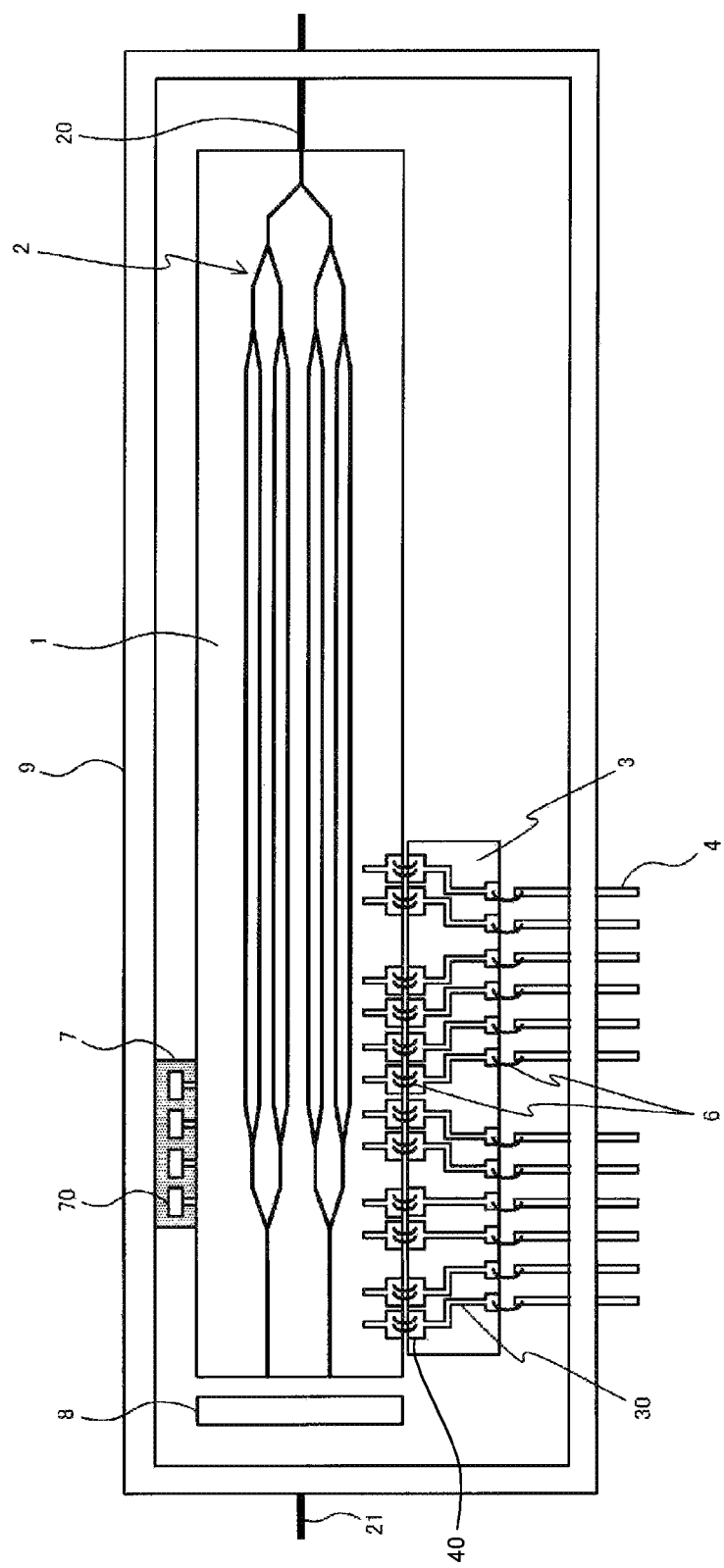
FIG. 1 is a plan view showing an example of a DP-QPSK optical modulator of the related art.

A feature of the optical modulator of the disclosure is that the terminating unit T is provided on the relay substrate 3 as shown in FIG. 2 and the like. The terminal resistors 70 for absorbing a modulation signal and suppressing reflection are provided at the terminal of the signal electrode. In the related art, as shown in FIG. 1, the terminal substrate 7 in which the terminal resistors 70 is incorporated is formed. However, since the number of terminal resistors incorporated into one substrate is increased and an amount of heat of the terminal resistors is increased, a problem that the entire terminal substrate becomes a large heat source and the optical waveguide substrate is heated, etc. is getting more prominent. In order to solve such a problem, as shown in FIG. 2 and the like, at least some of the terminal resistors 70 are used as the terminating unit T and incorporated into the relay substrate 3. In addition, as the relay substrate 3 in which the terminating unit T is provided, the relay substrate 3 where at least an electrical wiring for relaying a DC bias voltage to a DC bias electrode of the optical waveguide substrate 1 is formed may be used. It is also possible to provide the terminating unit T in the relay substrate 3 in which only electrical lines for relaying high frequency signals are formed in the signal electrode of the optical waveguide substrate 1. However, in this case, it is essential to take a countermeasure so that the high frequency signals leaking from the terminating unit T does not enter the electrical lines through which the electrical signals are inputted to the signal electrode.

As shown in FIG. 2, at least two or more terminal resistors 70 are provided in one terminating unit T in consideration of costs and ease of assembly. The number of elements of the terminal resistors provided in one optical modulator is appropriately selected according to a configuration of the optical modulator, an electrode design, and a housing design. In the optical modulator having a DP-QPSK configuration in FIG. 2, four terminal resistors 70 are provided, and some thereof are used as the terminating unit T and formed on the relay substrate 3. In addition, the remaining terminal resistors 70 are formed as the terminal substrate 7 of the related art.

Figure 3:
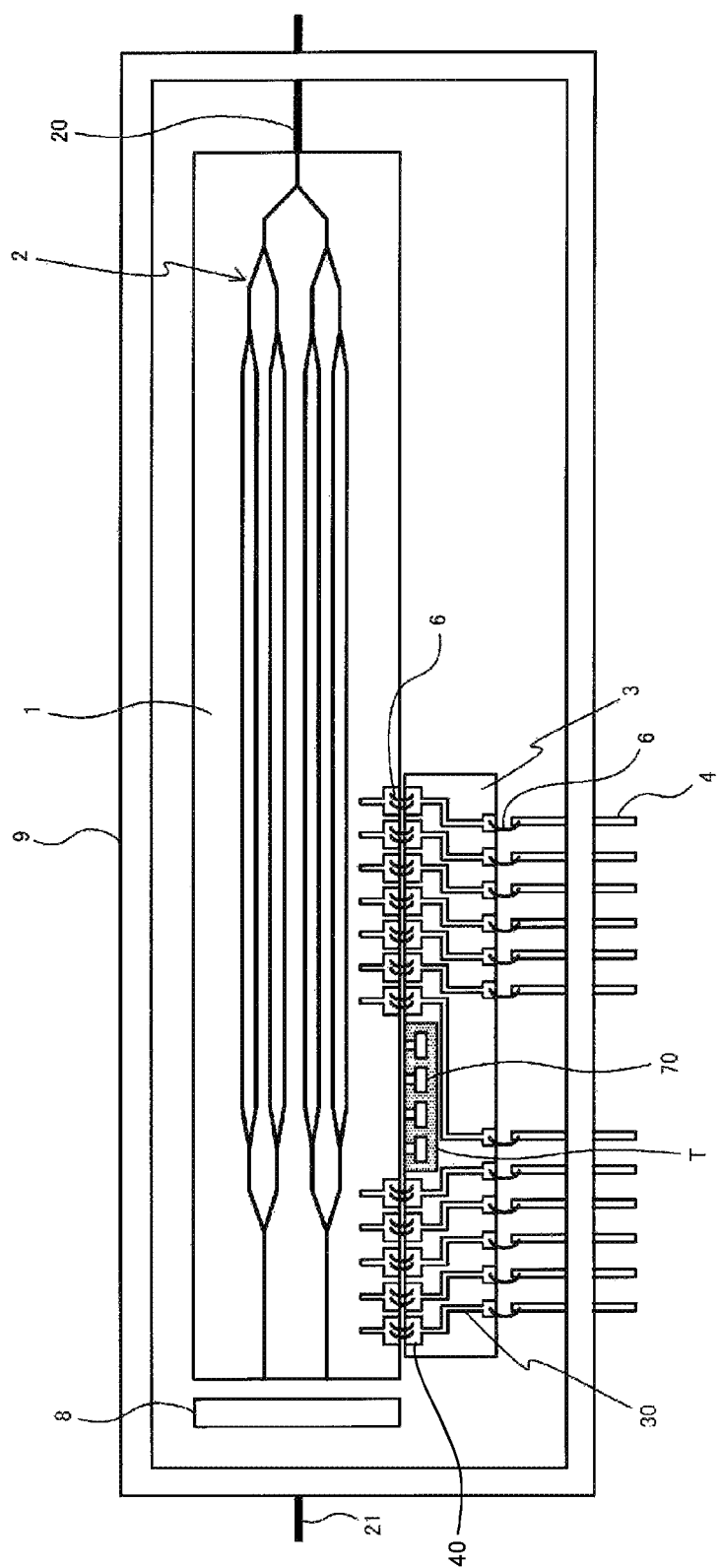
FIG. 3 is a plan view showing the second embodiment of the optical modulator according to the disclosure.

In addition to a case in which some terminal resistors 70 are provided on the relay substrate 3 as shown in the first embodiment in FIG. 2, all terminal resistors 70 can also be provided on the relay substrate 3 as the terminating unit T as shown in the second embodiment in FIG. 3. By providing the terminating unit T on the relay substrate 3, a substrate having an area and a volume larger than the terminating unit T itself can be used, and the heat generated by the terminal resistors 70 can be efficiently diffused and radiated to the entire substrate.

Figure 4:
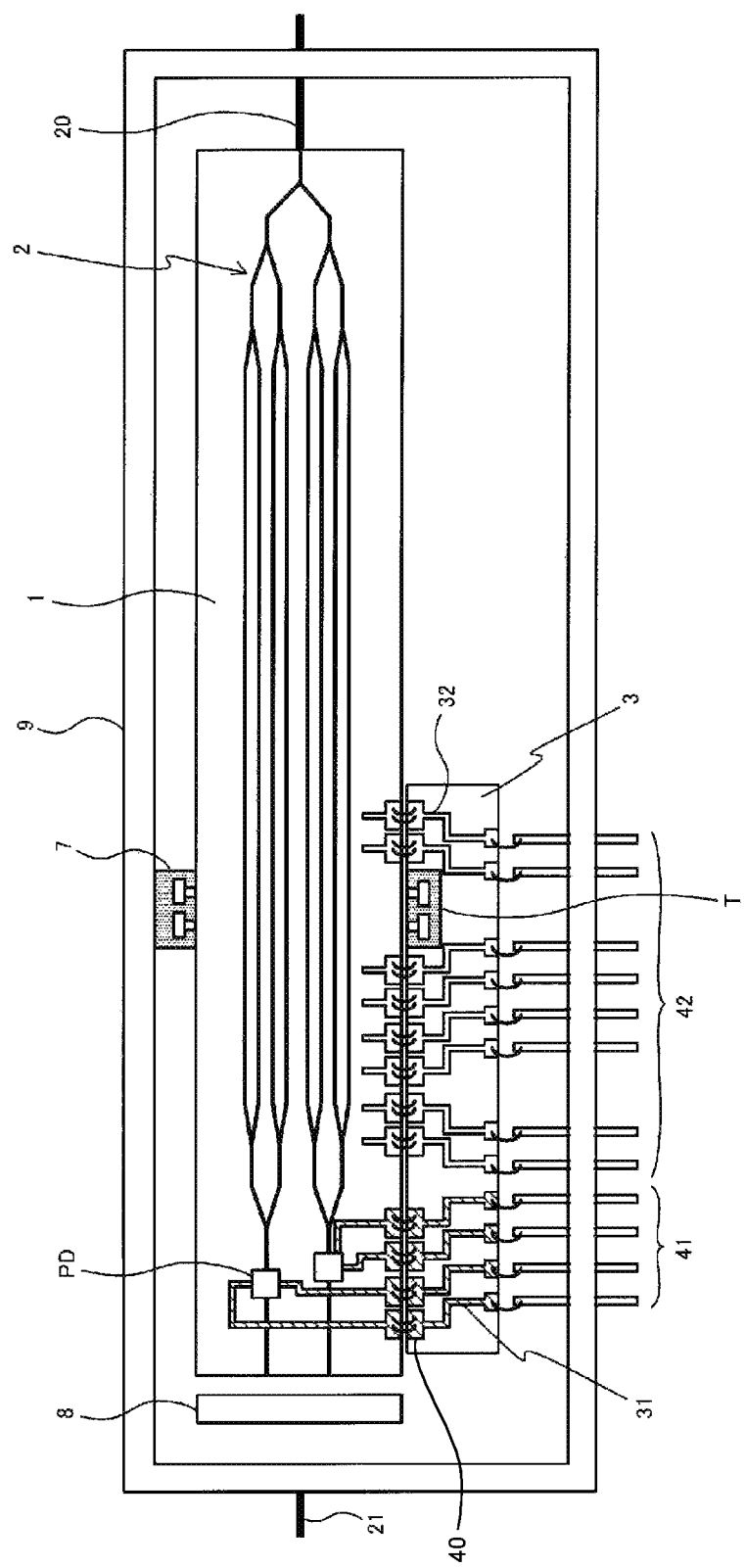
FIG. 4 is a plan view showing the third embodiment of the optical modulator according to the disclosure.
Figure 5:
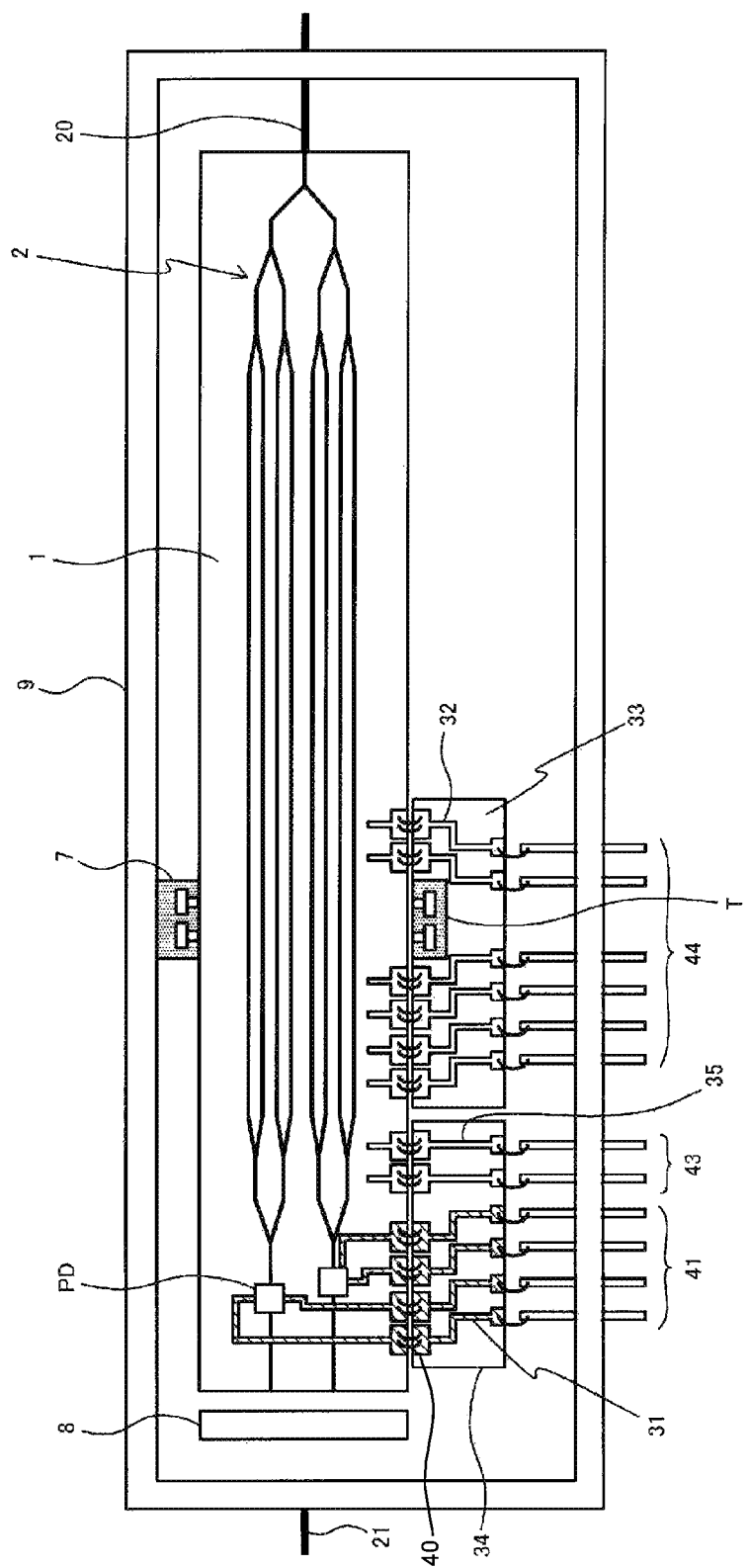
FIG. 5 is a plan view showing the fourth embodiment of the optical modulator according to the disclosure.
Figure 6:
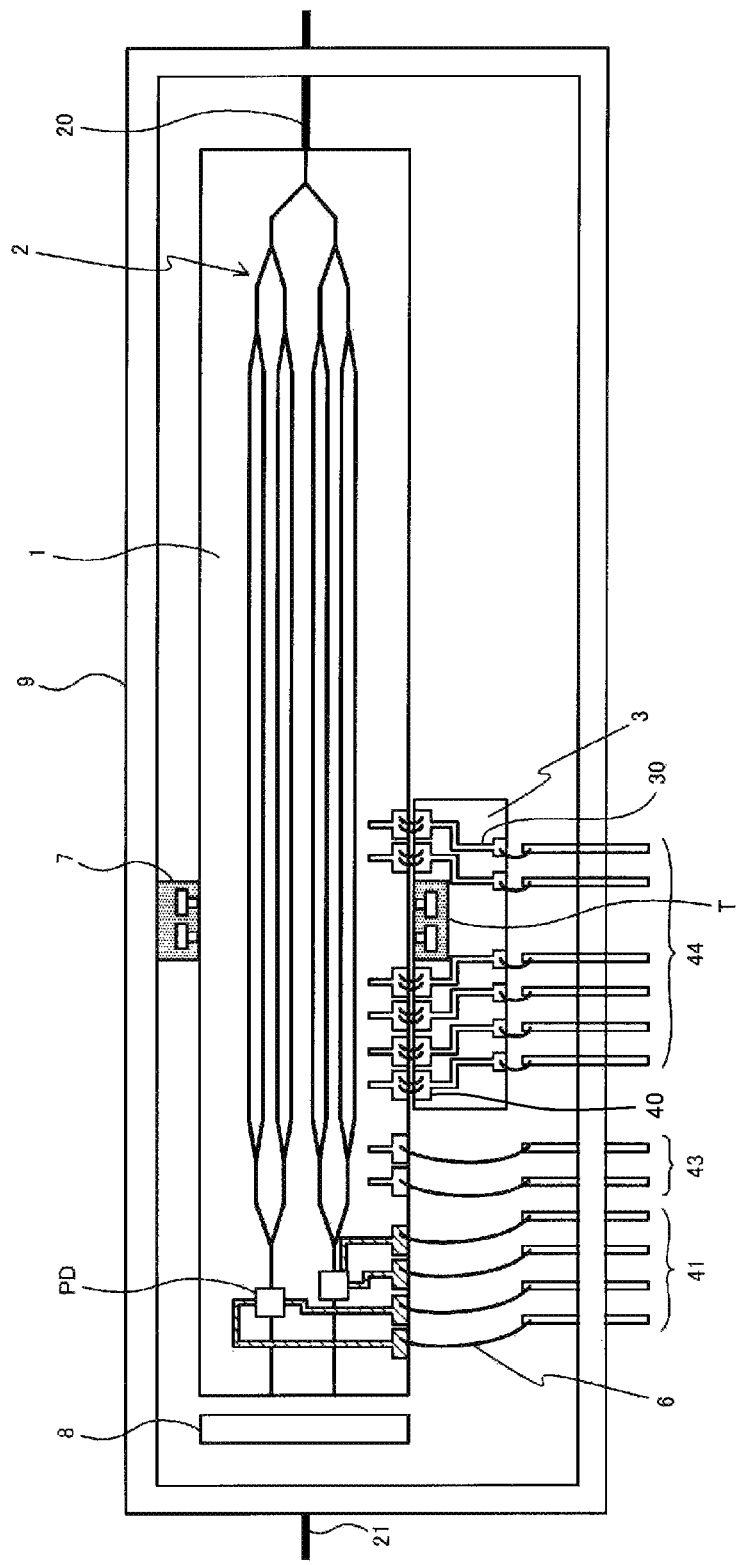
FIG. 6 is a plan view showing the fifth embodiment of the optical modulator according to the disclosure.

In addition, in the optical modulator, as shown in FIGS. 4 to 6, in order to perform bias control and the like, light receiving elements PD for detecting a part of light waves that propagate through the optical waveguide 2 or emission light emitted from the optical waveguide 2 may be provided. The light receiving elements PD may be configured in a manner that not only is disposed on the optical waveguide substrate 1 as shown in FIG. 4 and the like, but also may be disposed in the vicinity of the optical waveguide substrate 1, so as to detect the light waves emitted from the optical waveguide substrate 1.

As shown in FIG. 4, detection (light reception) signals outputted from the light receiving elements PD are transmitted to electrical wirings 31 for light reception on the relay substrate 3 through wirings on the optical waveguide substrate 1, and are outputted to the outside through input/output pins 41. When the terminating unit T is provided on the relay substrate 3, a part of the high frequency signals terminated by the terminal resistors 70 are released from the terminal resistors 70 and enters the electrical wirings 31 for light reception, and may become noise of the detection signals. The detection signals of the light receiving elements PD include a specific frequency used for bias control, and are easily affected by disturbance and noise of the high frequency signals.

In the disclosure, as shown in the third embodiment in FIG. 4, when the terminating unit T and the electrical wirings 31 for light reception are disposed on the same relay substrate 3, a configuration may be adopted that the terminating unit T and the electrical wirings 31 for light reception are disposed to be separated by a gap, and the high frequency signals leaking from the terminating unit T do not enter the electrical wirings 31 for light reception.

When the light receiving elements PD are provided, as shown in the fourth embodiment in FIG. 5, a configuration may be used that a relay substrate is formed of two substrates 33 and 34, and the substrate 33 where the terminating unit T is provided and the substrate 34 where the electrical wirings 31 for light reception are separately formed. In this manner, when the substrates 33, 34 are different from each other, it is possible to effectively suppress the high frequency signals from entering the electrical wiring 31.

In addition, as shown in the fifth embodiment in FIG. 6, electrical wirings for light reception may not be formed in the relay substrate 3, and can be replaced with wire bondings 6. Although the number of processes slightly increases due to bonding, it is then possible to greatly increase the degree of freedom in design such as a layout design of the light receiving elements PD and a layout design of various wiring patterns and the like, and it is possible to isolate the relay substrate 3 where signal lines of the light receiving elements PD and the terminal resistors are formed. Here, in FIGS. 5 and 6, the input/pins 41 outputs the detection signals of the light receiving elements PD. Input/output pins 43 supply a DC bias voltage. Input/output pins 44 mainly supply electrical signals for modulation. Here, a part of the input/output pins 44 may be used for DC bias.

Figure 7:
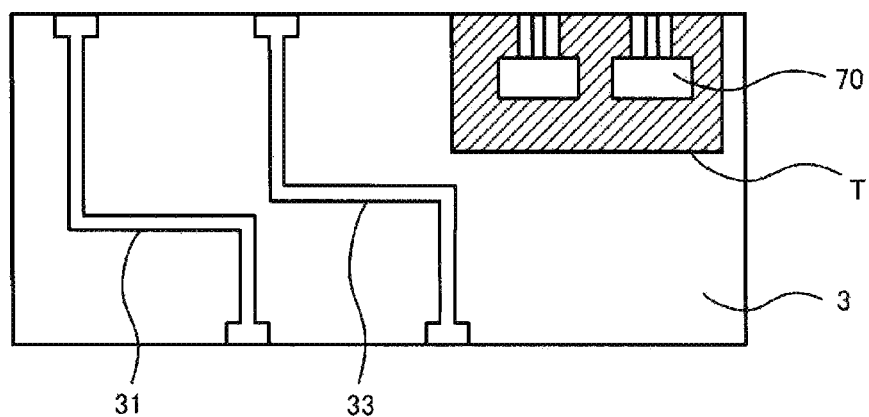
FIG. 7 is a diagram showing the sixth embodiment of the optical modulator according to the disclosure.
Figure 8:
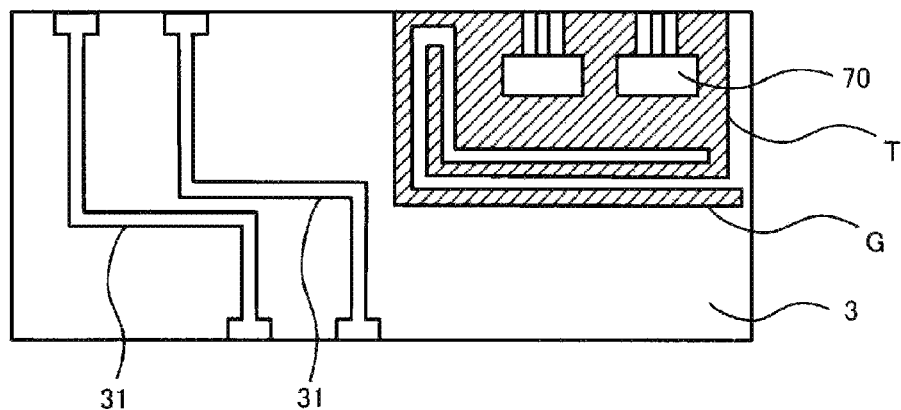
FIG. 8 is a diagram showing the seventh embodiment of the optical modulator according to the disclosure.
Figure 9:
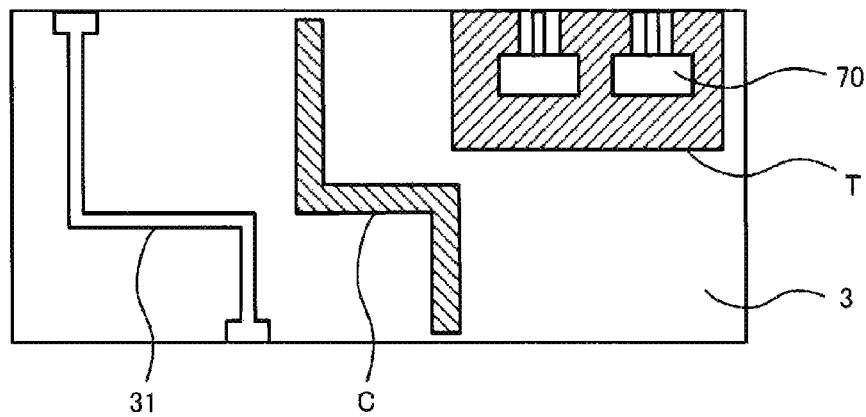
FIG. 9 is a diagram showing the eighth embodiment of the optical modulator according to the disclosure.

In addition, as shown in FIGS. 7 to 9, at least one of an electrical wiring 33 for relaying a DC bias voltage, a ground electrode G, and a groove C formed on the relay substrate 3 may be provided between the terminating unit T provided on the relay substrate 3 and the electrical wirings for light reception. By providing such a configuration, it is possible to suppress the high frequency signals leaking from the terminal resistors 70 from entering the electrical wirings 31 for light reception. The ground electrode G of FIG. 8 is electrically connected to the ground electrode provided on the terminating unit T, but the disclosure is not limited thereto. The ground electrode G may be electrically connected to a ground electrode that is used for an electrical wiring to the control electrode, or may be grounded to a housing 9 or the like separately.

As a method of increasing a heat dissipation effect of the relay substrate 3 and suppressing heat conduction to the optical waveguide substrate 1, a configuration that the thickness of the relay substrate 3 is formed to be thinner than that of the optical waveguide substrate 1, and a step is formed between a mounting surface of the housing 9 on which the relay substrate 3 is mounted and a mounting surface of the housing 9 on which the optical waveguide substrate 1 is mounted can be used.

Generally, since ceramic material used for the relay substrate 3 has a thermal conductivity inferior to metal material, it efficiently transfers heat generated in the terminal substrate 7 to the outside of the substrate, and thus the terminal substrate 7 can be effectively thinned.

It is necessary to select the thickness of the thinned relay substrate 3 in full consideration of a strength of a material used for the substrate, the thermal conductivity, the size, and the like, preferably, at least an optical waveguide is formed and made thinner than the thickness (generally 0.5 mm to 2.0 mm) of chips (optical waveguide substrate) installed next to the relay substrate 3. In consideration of dissipation of heat generated in the terminal resistors 70, the thinner the better. However, in consideration of the mechanical strength, and the design of an impedance of an electrical line to the control electrode and an impedance of the terminal resistor 70, it is preferable to set the range thereof to 0.05 mm to 0.8 mm.

Figure 10:
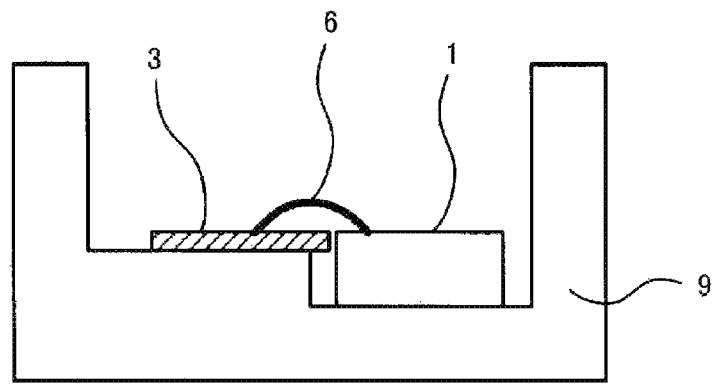
FIG. 10 is a cross-sectional view showing an example of the optical modulator.

As shown in FIG. 10, an upper surface of the relay substrate 3 on the housing 9 and the mounting surface of the optical waveguide substrate 1 are formed to have substantially the same height in order to suppress the electrical signals from deteriorating. As the thickness of the relay substrate 3 is thinner, the thickness of the housing 9 under the relay substrate 3 is formed thicker than the thickness of the housing 9 under the optical waveguide substrate 1, and a step is formed therebetween. As described in Patent Document 3, according to this step structure, it is possible to suppress heat conduction from the relay substrate 3 to the optical waveguide substrate 1. In addition, by combining a configuration of forming grooves (not shown) in the step part and making a tip of the relay substrate 3 protrude from the step, it is possible to further increase an effect of suppressing heat conduction.

Figure 11:
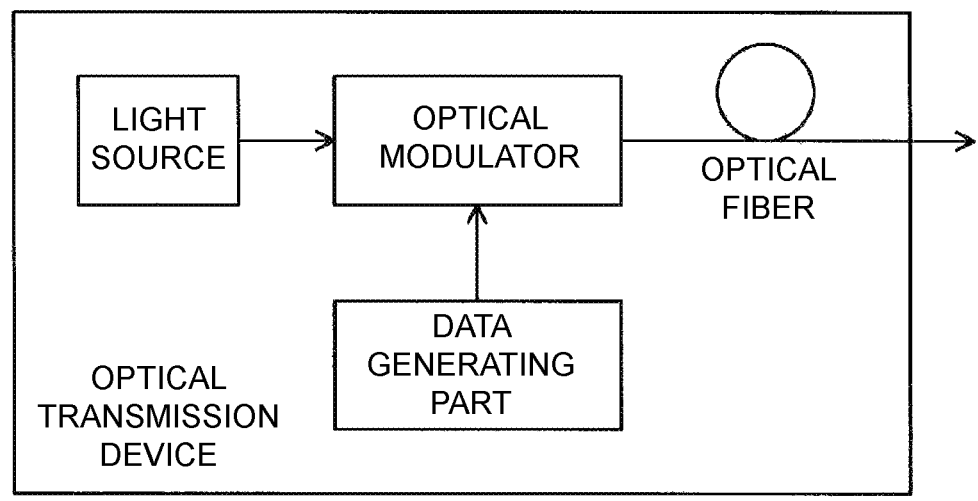
FIG. 11 is a diagram illustrating an example in which an optical modulator of the disclosure is incorporated into an optical transmission device.

FIG. 11 is a configuration example of an optical transmission device in which the optical modulator of the disclosure is mounted. A basic configuration of the optical transmission device includes a light source configured to generate a light wave that is introduced into the optical modulator, the optical modulator, a data generating part configured to apply signals to the optical modulator, and an optical fiber for guiding modulated light generated from the optical modulator to the outside.

When the optical transmission device starts to operate, the temperature of the optical modulator drifts. In order to stabilize transmission characteristics with high quality, it is necessary to perform an operation while an operation point of the optical modulator is controlled so that an appropriate state is maintained. This temperature drift is thought to be caused by the heat generated in optical modulator peripheral components such as the light source and the data generating part in the related art.

However, in a DP-QPSK optical modulator, a small optical modulator, and the like, large temperature drift may occur immediately after the operation of the optical transmission device starts, and transmission characteristics of the optical transmission device may become very unstable. One reason is the heat generated in the terminal resistors inside the optical modulator itself In particular, this phenomenon is particularly noticeable when an optical modulator configuration in which a plurality of high frequency signals is inputted and a plurality of terminal resistors are formed on the same substrate, when amplitudes of input signals are large, and additionally, when the size of an optical modulator is reduced.

In order to address this problem, by disposing the optical modulator of the disclosure in the optical transmission device, it is possible to suppress the temperature drift due to the heat generated in the terminal resistors, and it is possible to stabilize transmission characteristics with high quality.

The above examples are not limited to a configuration of the DP-QPSK optical modulator using a LiNbO$_3$ substrate. The disclosure can be applied regardless of modulation methods as long as the optical modulator includes terminal resistors and the heat generated in the terminal resistors influences characteristics of the optical modulator. In addition, of course, the optical waveguide substrate may be made of a semiconductor material such as InP or Si, and even if a LiNbO$_3$ substrate is used, the disclosure can be applied regardless of a crystal orientation of Xcut, Zcut, or the like.

In addition, while a case that only terminal resistors are formed on the terminating unit has been exemplified in the above examples, capacitors, other electronic parts, through conductors, and multi-layered electronic circuits may be incorporated into the same terminating unit.

As described above, according to the disclosure, it is possible to provide a small and inexpensive optical modulator having suppressed temperature drift and high reliability. In addition, it is possible to provide an optical transmission device that the optical modulator of the disclosure is mounted and which has high reliability and suppressed temperature drift.

Other Configurations

In view of above description, an optical modulator of the disclosure and an optical transmission device using the same are provided.

(1) The optical modulator includes an optical waveguide substrate wherean optical waveguide is formed; a control electrode that is provided on the optical waveguide substrate and applies an electric field to the optical waveguide; and a relay substrate that is disposed in the vicinity of the optical waveguide substrate and includes electrical wirings for relaying electrical signals from the outside to the control electrode. The control electrode includes a signal electrode. The optical modulator comprises terminating units that include terminal resistors that terminate the signal electrode. At least a part of the terminating units are provided on the relay substrate.

(2) In the optical modulator according to (1), at least two or more terminal resistors are provided in one terminating unit.

(3) In the optical modulator according to (1) or (2), the control electrode includes the signal electrode and a DC bias electrode, and on the relay substrate, at least electrical wirings for relaying a DC bias voltage to the DC bias electrode is provided.

(4) The optical modulator according to any one of (1) to (3) includes light receiving element configured to receive a part of light waves that propagates through the optical waveguide or a part of emission light emitted from the optical waveguide, and electrical wirings for light reception for guiding light receiving signals from the light receiving elements to the outside is provided on the relay substrate.

(5) In the optical modulator according to (4), at least one of an electrical wiring for relaying a DC bias voltage, a ground electrode, and a groove formed on the relay substrate is provided between the terminating unit provided on the relay substrate and the electrical wirings for light reception.

(6) The optical modulator according to any one of (1) to (3) includes light receiving elements configured to receive a part of light waves that propagates through the optical waveguide or a part of emission light emitted from the optical waveguide, and electrical wirings for light reception for guiding light receiving signals from the light receiving elements to the outside is not disposed on the relay substrate in which the terminating unit is provided.

(7) The optical modulator according to any one of (1) to (6) includes a housing in which the optical waveguide substrate and the relay substrate are mounted, the thickness of the relay substrate is formed to be thinner than that of the optical waveguide substrate, and a step is formed between a first mounting surface of the housing in which the relay substrate is mounted and a second mounting surface of the housing in which the optical waveguide substrate is mounted.

(8) An optical transmission device is further provided to includes the optical modulator according to any one of (1) to (7); a data generating part configured to generate data signals that are applied to the optical modulator; and a light source configured to input light waves to the optical modulator.

According to the disclosure, the terminating units including the terminal resistors that terminates the signal electrode are provided, and at least a part of the terminating units is provided in the relay substrate. Therefore, by a substrate larger than the terminating unit itself, the heat generated in the terminal resistors can be effectively diffused and dissipated. In this way, the local heat generation in the terminating unit can be reduced an influence of heat generation on the optical waveguide substrate can be suppressed. In addition, it is not necessary to separately provide a substrate (terminal substrate) for the terminating unit, which contributes to reducing the size of the entire device, forming a multi-element configuration, and reducing costs.

What is claimed is:

1. An optical modulator, comprising:
an optical waveguide substrate in which an optical waveguide is formed;
a control electrode, provided on the optical waveguide substrate and applying an electric field to the optical waveguide;
a relay substrate, disposed in the vicinity of the optical waveguide substrate and including electrical wirings for relaying electrical signals from an outside to the control electrode;
light receiving elements, receiving a part of light waves that propagates through the optical waveguide or a part of emission light emitted from the optical waveguide and
a housing, where the optical waveguide substrate and the relay substrate are mounted,
wherein the control electrode includes a signal electrode, the optical modulator comprises terminating units that include terminal resistors that are provided at a terminal of the signal electrode,
at least a part of the terminating units are provided on the relay substrate, and
electrical wirings for light reception for guiding light receiving signals from the light receiving elements to the outside is not disposed on the relay substrate in which the terminating unit is provided, and
a thickness of the relay substrate is formed to be thinner than that of the optical waveguide substrate, and
a step is formed between a first mounting surface of the housing where the relay substrate is mounted and a second mounting surface of the housing where the optical waveguide substrate is mounted.

2. The optical modulator according to claim 1, wherein at least two or more terminal resistors are provided in one terminating unit.

3. The optical modulator according to claim 1, wherein the control electrode includes the signal electrode and a DC bias electrode, and
on the relay substrate, at least electrical wirings for relaying a DC bias voltage to the DC bias electrode are provided.

4. An optical transmission device, comprising:
the optical modulator according to claim 1;
a data generating part, generating data signals that are applied to the optical modulator; and
a light source, inputting light waves to the optical modulator.

5. The optical transmission device according to claim 4, wherein at least two or more terminal resistors are provided in one terminating unit.

6. The optical transmission device according to claim 4, wherein the control electrode includes the signal electrode and a DC bias electrode, and
on the relay substrate, at least electrical wirings for relaying a DC bias voltage to the DC bias electrode are provided.

7. The optical transmission device according to claim 4, wherein at least one of an electrical wiring for relaying a DC bias voltage, a ground electrode, and a groove formed on the relay substrate is provided between the terminating unit provided on the relay substrate and the electrical wirings for light reception.

8. An optical modulator, comprising:
an optical waveguide substrate in which an optical waveguide is formed;
a control electrode, provided on the optical waveguide substrate and applying an electric field to the optical waveguide;
a relay substrate, disposed in the vicinity of the optical waveguide substrate and including electrical wirings for relaying electrical signals from an outside to the control electrode;
light receiving elements, receiving a part of light waves that propagates through the optical waveguide or a part of emission light emitted from the optical waveguide and
a housing, where the optical waveguide substrate and the relay substrate are mounted,
wherein the control electrode includes a signal electrode, the optical modulator comprises terminating units that include terminal resistors that are provided at a terminal of the signal electrode,
at least a part of the terminating units are provided on the relay substrate, and electrical wirings for light reception for guiding light receiving signals from the light receiving elements to the outside is provided on the relay substrate,
at least one of an electrical wiring for relaying a DC bias voltage, a ground electrode, and a groove formed on the relay substrate is provided between the terminating unit provided on the relay substrate and the electrical wirings for light reception, and
a thickness of the relay substrate is formed to be thinner than that of the optical waveguide substrate, and
a step is formed between a first mounting surface of the housing where the relay substrate is mounted and a second mounting surface of the housing where the optical waveguide substrate is mounted.

9. An optical transmission device, comprising:
the optical modulator according to claim 8;
a data generating part, generating data signals that are applied to the optical modulator; and
a light source, inputting light waves to the optical modulator.

* * * * *